(12) United States Patent
Lewis

(10) Patent No.: US 7,742,208 B2
(45) Date of Patent: Jun. 22, 2010

(54) HOLOGRAPHIC DISPLAY AND METHODS OF MANUFACTURE AND USE

(75) Inventor: Howard Duiane Lewis, Arlington, TN (US)

(73) Assignee: Brother International Corporation, Bridgewater, NJ (US)

(*) Notice: Subject to any disclaimer, the term of this patent is extended or adjusted under 35 U.S.C. 154(b) by 252 days.

(21) Appl. No.: 11/466,082

(22) Filed: Aug. 21, 2006

(65) Prior Publication Data

US 2008/0043301 A1 Feb. 21, 2008

(51) Int. Cl.
*G03H 1/02* (2006.01)
*G02B 5/18* (2006.01)

(52) U.S. Cl. .................. 359/3; 359/4; 359/15; 359/566; 359/569; 313/524

(58) Field of Classification Search .................. 359/15, 359/3, 4, 566, 569; 313/524
See application file for complete search history.

(56) References Cited

U.S. PATENT DOCUMENTS

| | | | |
|---|---|---|---|
| 6,211,976 B1* | 4/2001 | Popovich et al. ............... 359/15 |
| 6,416,855 B1* | 7/2002 | Rossignol et al. ............ 428/323 |
| 6,667,572 B2* | 12/2003 | Lewis .......................... 313/524 |
| 6,984,265 B1* | 1/2006 | Raguse et al. .................. 117/73 |
| 2003/0094898 A1 | 5/2003 | Lewis | |

* cited by examiner

*Primary Examiner*—Audrey Y Chang
(74) *Attorney, Agent, or Firm*—Frommer Lawrence & Haug LLP; Bruce E. Black

(57) ABSTRACT

A rewriteable diffraction grating contains first nanoparticles and second nanoparticles. Each first nanoparticle is configured and arranged to generate one or more charge carriers in response to a write beam. Each second nanoparticle is configured and arranged to substantially alter its response to light from a read beam upon receiving one or more charge carriers from the first nanoparticles. The second nanoparticles are disposed in proximity to the first nanoparticles to permit charge carriers generated by the first nanoparticles to interact with the second nanoparticles.

21 Claims, 3 Drawing Sheets

HOLOGRAPHIC DISPLAY AND METHODS OF MANUFACTURE AND USE

FIELD

The invention is directed to displays using holographic imaging and methods of manufacture and use. The invention is also directed to displays using a rewriteable diffraction grating, and methods of manufacture and use of such displays, as well as the rewriteable diffraction grating itself.

BACKGROUND

The concept of holography was first described in 1947. However, at the time no coherent light sources existed so holograms were of poor quality and were generally made using mercury arc lamps. With the invention of the laser, holograms improved.

In general, holographic recording generates an interference pattern between a reference wave and an object wave. Unlike two dimensional photography, holographic imaging records both the amplitude and phase of the object wave. Illumination of the hologram with coherent light can recreate both the reference wave and the object wave.

Conventionally, transmission type holography typically uses a photographic plate or photosensitive gelatin film. The plates are typically formed of glass coated with an emulsion of silver halide crystals. Upon exposure to light, the silver ions are partially converted to silver metal darkening the exposed region. As such, the holographic recording process is irreversible. In addition, photoconversion of silver ions to metallic silver generally requires strong light flux or significant exposure times. Over the exposure time, (30 seconds to several minutes), the holographic interference pattern should remain stable to within a quarter wavelength. Vibration isolation tables or short high power laser pulses can be used to achieve this objective.

BRIEF SUMMARY

One embodiment is a rewriteable diffraction grating that contains first nanoparticles and second nanoparticles. Each first nanoparticle is configured and arranged to generate one or more charge carriers in response to a write beam. Each second nanoparticle is configured and arranged to substantially alter its response to light from a read beam upon receiving one or more charge carriers from the first nanoparticles. The second nanoparticles are disposed in proximity to the first nanoparticles to permit charge carriers generated by the first nanoparticles to interact with the second nanoparticles.

Another embodiment is a holographic display that includes at least three holographic projection units configured and arranged to create images that overlap with each other to form a final multicolor image. Each image creation unit has a write beam generator, a read beam generator, and a rewriteable diffraction grating configured and arranged to generate a diffraction pattern in response to a write beam from the write beam generator and to produce an image when illuminated with a read beam from the read beam generator.

Yet another embodiment is a method of making a holographic image. The method includes writing a diffraction pattern on each of a plurality of rewriteable diffraction gratings and illuminating each of the diffraction patterns with a read beam. The images formed by each of the diffraction patterns are overlapped to produce the holographic image.

A further embodiment is a method of making a rewriteable diffraction grating. The method includes forming a first layer of first nanoparticles. Each first nanoparticle is configured and arranged to generate one or more charge carriers in response to the write beam. A second layer is formed of second nanoparticles. Each second nanoparticle is configured and arranged to substantially alter its response to light from a read beam upon receiving one or more charge carriers from the first nanoparticles. The second nanoparticles are disposed in proximity to the first nanoparticles to permit charge carriers generated by the first nanoparticles to interact with the second nanoparticles.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 1B illustrating the display with illumination of the rewriteable diffraction grating by a read beam; and FIG. 1C illustrating the display with illumination of the rewriteable diffraction grating by an erase beam;

DETAILED DESCRIPTION

The invention is directed to displays using holographic imaging and methods of manufacture and use. The invention is also directed to displays using a rewriteable diffraction grating, and methods of manufacture and use of such displays, as well as the rewriteable diffraction grating itself.

The display includes at least a write beam generator, a read beam generator, an erase beam generator, and a rewriteable diffraction grating. In one embodiment, the display includes each of these components in a separate unit for each of three colors (for example, red, green, and blue.) The image generated by each of these three color units can be overlapped to provide a full color image.

One example of a rewriteable diffraction grating includes two layers. Each layer contains nanoparticles. These nanoparticles can be doped with a doping agent, such as metal atoms or ions. One layer includes nanoparticles that absorb light from the write beam and excite at least one charge carrier. The second layer includes nanoparticles that receive the charge carriers from the first layer. When a nanoparticle of the second layer receives a charge carrier, that nanoparticle's interaction with the read beam is altered; for example, the nanoparticle can become more opaque to the read beam. Thus, the write beam can be utilized to write a diffraction pattern on the rewriteable diffraction grating and the read beam can then illuminate the diffraction pattern and create an image. The erase beam erases the diffraction pattern. A new diffraction pattern can then be written using the write beam.

As an alternative, a single layer rewriteable diffraction grating can be used with both types of nanoparticles disposed in a single layer. For example, the two types of nanoparticles can be disposed randomly, or in an organized manner, in the single layer.

Figure 1A:
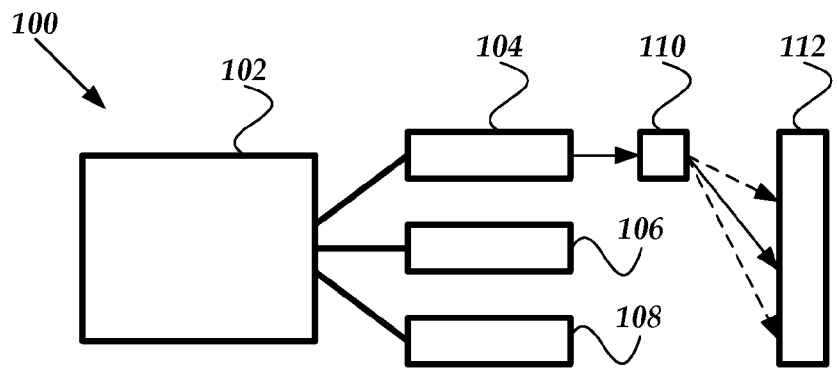
FIGS. 1A-1C illustrate a schematic plan view of one embodiment of a display, according to the invention, with FIG. 1A illustrating the display with illumination of a rewriteable diffraction grating by a write beam.
Figure 1B:
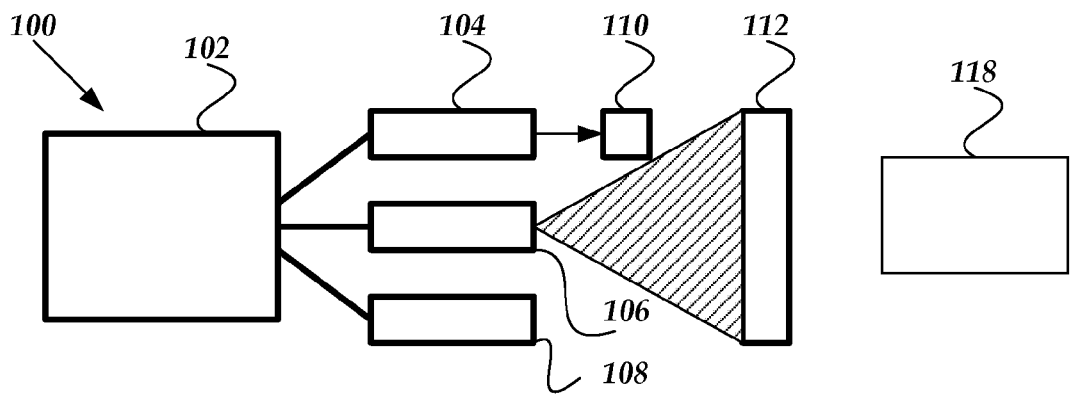
Figure 1C:
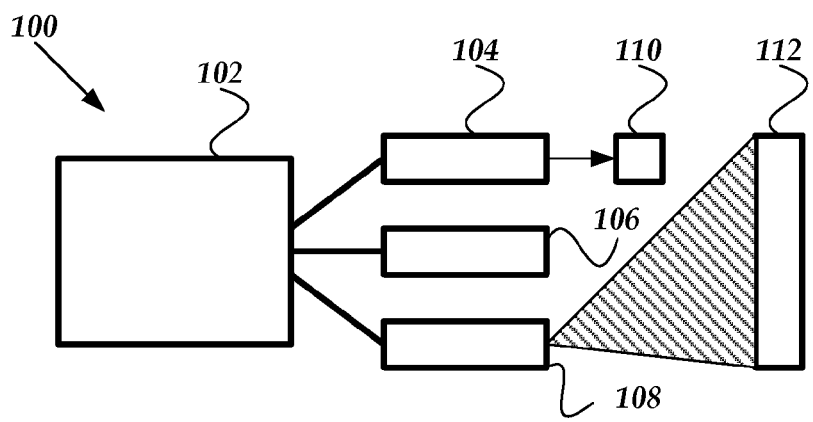

FIGS. 1A-1C illustrate one embodiment of a display 100. The display can be used in a variety of applications. For example, the display can be used to produce moving holographic images. In some embodiments, the display can receive signals (e.g., broadcast signals such as television signals) through a wired connection or from a wireless source. The display can be attached to a device, such as a computer or other machine, that provides image information to the display. In some embodiments, the display can be used as a television, computer monitor, advertising display, heads-up display (for example, in a vehicle, such as a car or airplane), or decorative display.

The display can also be used to produce static images. In some instances, the static images may change at regular or irregular intervals. For example, a display may be used to advertise products with the displayed advertisement changing periodically or remaining static on a permanent or semi-permanent basis.

The display 100 includes a control unit 102, a write beam generator 104, a read beam generator 106, an optional erase beam generator 108, an optional beam director 110, and a rewriteable diffraction grating 112. The control unit 102 controls the operation of one or more of the other listed components of the display 100 including the operation of the write beam generator 104, read beam generator 106, and erase beam generator 108, as described below. The control unit may receive images or diffraction patterns from an external source. In some embodiments, the control unit is capable of processing images to create a diffraction pattern that can be written on a rewriteable diffraction grating. Such processing of images to create diffraction patterns is well-known in the art.

The control unit may receive images or diffraction patterns using any suitable technology. For example, the control unit may be capable of receiving images or diffraction patterns from a wired connection coupled to an image source, such as a computer, other device, or a cable television source; and/or the control unit may be capable of receiving images or diffraction patterns from a wireless source such as RF broadcast signals or telecommunications signals. The control unit may be capable of receiving images or diffraction patterns from removable media such as a diskette, compact disc, DVD, memory stick, or the like. The control unit may also include a memory unit to store images or diffraction patterns. The write beam generator 104 and read beam generator 106 produce beams of light and can be devices such as, for example, lasers, light-emitting diodes, arc lamps, and the like. Preferably, the generators 104, 106 produce a substantially monochromatic beam of light. For example, a laser can be used for the write beam and read beam to provide a light source which predominantly emits light of a single wavelength or a narrow range of wavelengths. Other light sources, such as arc lamps, can also be suitable to accomplish the process described below, particularly if the light source is wavelength filtered.

The rewritable diffraction grating 112 is capable of having a diffraction pattern written onto the grating 112 by the write beam from the write beam generator 104 and read by the read beam from the read beam generator 106. Examples of suitable rewriteable diffraction gratings are described in U.S. Pat. No. 6,667,572, incorporated herein by reference.

Another type of rewriteable diffraction grating 112 is illustrated in FIGS. 2A-2D. The rewriteable diffraction grating 112 contains two layers 200, 202. Each layer is formed of nanoparticles optionally disposed in a binder, such as a polymer. The nanoparticles typically have an average diameter of no more than 1 micrometer. Generally, the average diameter of the nanoparticles is in the range of 5 to 500 nanometers. Preferably, the average diameter of the nanoparticles is in the range of 10 to 50 nanometers.

The layers of the rewriteable diffraction grating can be formed by any suitable method. Such methods include disposing the nanoparticles of both layers in a solvent or dispersant and allowing the layers to self-assemble based on properties such as, for example, density, size, density, solubility, structure, and the like. Such self-assembly processes may include, for example, sedimentation or solvent separation processes. Another method includes dispersing the nanoparticles in a binder, such as a polymer, and allowing the layers to form by self-assembly. Examples of suitable binders include, but are not limited to, polyvinyl alcohol, polymethyl methacrylate, and polycarbonate, polystyrene. As another alternative, particles can be embedded in silicate glasses via diffusion of precursors into a silica glass at high temperatures. Yet another method includes forming a first layer with a first set of nanoparticles disposed in a solvent, dispersant, or binder and then coating a second layer on the first layer, where the second layer contains a second set of nanoparticles disposed in a solvent, dispersant, or binder. The first layer can be formed by any method including coating or otherwise depositing the first layer on a substrate. The rewriteable diffraction grating may optionally include the substrate or, in some instances, the rewriteable diffraction grating may be removed from the substrate after formation.

In some embodiments, the two layers are annealed to allow a degree of diffusion of material between the layers. Such annealing may blur the boundary between the two layers. Diffusion between the layers may increase the surface area or contact between the two layers and facilitate operation of the rewriteable diffraction grating.

In yet other embodiments, a single layer (instead of two layers) of particles can be formed. The single layer of particles contains both types of particles used to write and read the diffraction pattern. The single layer of particles may include random, or ordered, arrangement of the particles.

In one embodiment, the nanoparticles are formed using a semiconductor material. Preferably, the semiconductor material has a relatively wide band-gap to resist substantial thermal promotion of charge carriers into the conduction band at expected operating temperatures. In one embodiment, the band-gap is at least approximately 3.5 eV. Examples of suitable materials include, but are not limited to, silica, titanium dioxide, zinc oxide, alumina, aluminum-silicon oxide, silicon carbide, and cubic-phase zirconium oxide.

The nanoparticles can be formed using any suitable method including, for example, particle precipitation, milling, and sol-gel precipitation. One particularly useful method includes ultrasound induced cavitation (e.g., sonication) of the desired material in a fluid, such as water, isopropanol, or a combination thereof. The size of the particles can be influenced by the viscosity and vapor pressure of the fluid, as well as the ultrasound frequency. Ultrasound induced cavitation promotes the break-up of the desired material into nanoparticles. For example, a 20 kHz ultrasound horn can be disposed in an aqueous dispersion containing silica particles. In one embodiment, the original powder is a 350 mesh powder with particle sizes on the order of several micrometers. The ultrasound horn is allowed to operate for a period of time (e.g., 2 to 5 hours or more).

In one embodiment, approximately 1-3 grams of 350 mesh silica particles are placed in a beaker with approximately 200 mL of deionized water. A 400 watt Branson ultrasonifier with a ½ inch sonicator probe and tip is used. The tip is placed in the beaker and the power setting is set to 80%. A pulse frequency of 0.1 seconds is set with a duty cycle of 50%. The dispersion is sonicated for at least 3 hours. At the end of the sonication period the initially dull white dispersion has turned dark gray. The average particle size, as measured by scanning electron microscope, is about 100-150 nanometers in size. The dispersion is centrifuged for one hour at 3500 rpm. The supernatant is then carefully poured off. The remaining solids are then collected and the excess water baked off. The solids are then calcined at a temperature of at least 900 degrees Celsius for at least 3 hours. After this step the average particle size is approximately 50-80 nanometers in size. The particle size depends, at least in part, on the frequency of the sonication pulses, the length of sonication, and the temperature of the post-sonication calcination.

While not wishing to be limited to any particular theory, it is believed that the ultrasound horn produces bubbles in the fluid which burst and rupture nearby silica particles, although there may be other mechanisms for nanoparticle generation as well. The final size of the nanoparticles is often dependent on the bubble size which, in turn, depends, at least partially, on the viscosity and vapor pressure of the fluid, as well as the frequency of sonication and the length of time that sonication takes place. The hardness of the material may also impact the size of the nanoparticles.

The nanoparticles can be doped with one or more doping agents. The doping agents can be added prior to, during, or after sonication of the particles. In some instances, the doping agents at least partially coat the surface of the nanoparticles. In some embodiments, the doping agents can be disposed in pores of the nanoparticles. For example, aluminum-silicon oxides can be porous with pores that can receive guest ions (i.e., doping agents.)

Optionally, the nanoparticles can be annealed at higher temperatures to allow the doping agents to further diffuse from the surface of the nanoparticles into the interior of the nanoparticles. Alternatively or additionally, the doping agents can be added prior to or during sonication where the ultrasound induced cavitation may inject doping agents into the interior of the nanoparticles.

The doping agents can be used to modify the band gap of the nanoparticles. The doping agents can also alter the light absorbance characteristics of the nanoparticle as the valence state of the doping agent changes. Examples of suitable doping agents include, but are not limited to, iron, chromium, manganese, vanadium, copper, niobium, silver, gold, europium, samarium, neodymium, and other metals. The doping agents can be provided in the range of 0.1 to 50 mol % of the nanoparticles and preferably in the range of 1 to 25 mol %. In some instances, the doping agents are 10 to 15 mol % of the nanoparticles.

The nanoparticles of the first and second layers 200, 202 are generally different in at least one aspect to provide differing response to the write beam and read beam. These nanoparticles can differ in, for example, doping agent, particle size, semiconductor material, and doping agent concentration. In one embodiment, the same semiconductor material is used for both sets of nanoparticles, but a different doping agent is used in each set. For example, one set of nanoparticles includes iron as a doping agent and the second set includes chromium.

Figure 2A:
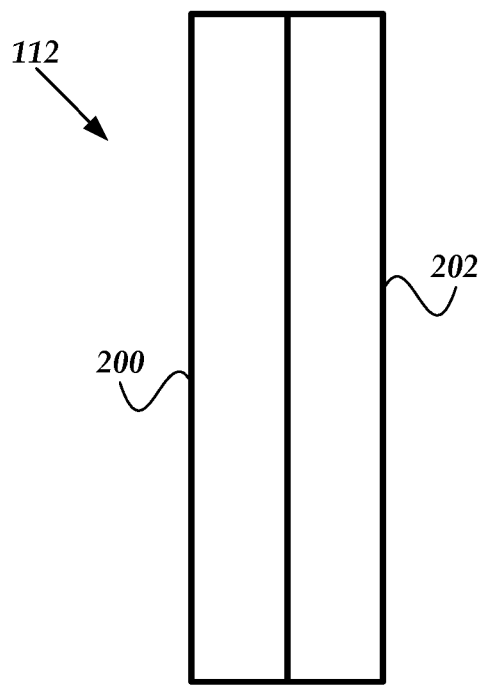
FIGS. 2A-2D illustrate a schematic cross-sectional view of a rewriteable diffraction grating during selected stages of writing and erasing a diffraction pattern on the grating, according to the invention.
Figure 2B:
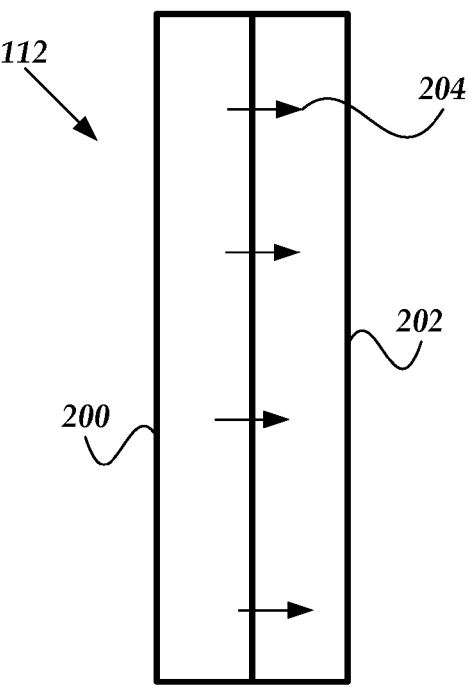

In one layer 200 of the rewriteable diffraction grating 112, the nanoparticles are capable of absorbing light from the write beam. Typically, the band gap of these nanoparticles is less than the energy of the write beam. For example, the write beam may be a Nd:YAG laser frequency doubled to 532 nm which emits photons having an energy of 2.3 eV (electron Volts). Iron-doped silica nanoparticles can have a band gap of under 2.3 eV with approximately 6 mol. % doping and, therefore, can absorb the write beam. The absorption of light produces electrons or other charge carriers 204 that are sufficiently energetic to allow them to tunnel or otherwise travel to a nearby nanoparticle in the second layer 202, as illustrated in FIG. 2B.

Figure 2C:
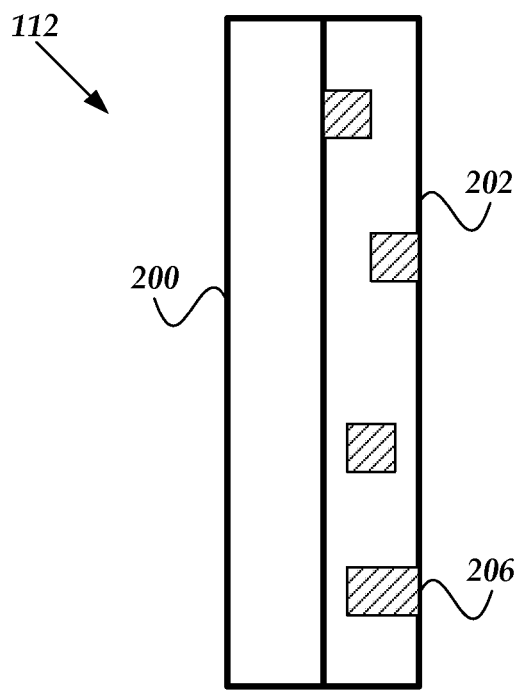

When a nanoparticle of the second layer receives an electron or other charge carrier from a nanoparticle of the first layer, the absorbance or scattering of the read beam by that nanoparticle 206 is altered, as illustrated in FIG. 2C. For example, the absorbance or scattering may be increased so that the nanoparticle becomes more opaque to the read beam. As an alternative, the absorbance or scattering may be decreased so that the nanoparticle becomes more transparent. As one example, the nanoparticle may be doped with a metal ion that, upon receiving an electron from the first layer, enters a lower valence state (e.g., a zero valence state) and becomes more opaque to the read beam. Examples of such doping agents include, but are not limited to, monovalent ions such as sodium, potassium, and hydrogen; divalent ions such as calcium and magnesium; and multivalent ions such as iron and chromium.

Preferably, the nanoparticles of the first layer are substantially transparent to the read beam. In one embodiment, the read beam has a longer wavelength (i.e., has lower energy) than the write beam. For example, when using a semiconductor for the nanoparticles of the first layer the energy of the photons in the read beam can be less than the band gap of the nanoparticles in the first layer to prevent or reduce any absorption or scattering of the read beam by the nanoparticles of the first layer. For example, a write beam can be at 532 nm and a read beam can be at 633 nm.

The write beam 104 is typically rastered, scanned, or otherwise moved over the rewriteable diffraction grating 112 and is turned on and off during this movement to write a desired diffraction pattern on the rewriteable diffraction grating 112. The rastering or scanning speed can limit the speed at which images can be changed. In some embodiments, the write beam can write over the entire rewriteable diffraction grating in a period of no more than 1 second, preferably, no more than 100 microseconds, for example, in the range of 10 to 100 microseconds. In some embodiments, multiple write beam generators can be used to simultaneously write on different portions of the rewriteable diffraction grating. In yet other embodiments, the image is relatively static or changing on a time scale of more than 1 second.

The narrowness of the write beam can impact the resolution of the overall display although other factors may limit the resolution as well. As one example, the preferred size of the write beam is 600 nanometers or any size above the diffraction limit and at or below the wavelength of the read beam. The preferred size of the read beam is the size of the diffraction pattern. The size of the diffraction grating can be, for example, 50-100 square millimeters. Any technique can be used to pixellate the diffraction pattern so that the write beam can be turned on or off, as appropriate, at each point on the diffraction grating.

The write beam generator 104 is controlled by the control unit 102 which provides signals to generate the diffraction pattern as the write beam is moved over the rewriteable diffraction grating. Any method of rastering, scanning, or otherwise moving the write beam can be used including mechanical methods of moving the write beam generator.

Another method of moving the write beam over the rewriteable diffraction grating uses a beam director 110 that intercepts and redirects the write beam to the desired portion of the rewriteable diffraction grating, as illustrated in FIG. 1A. Any suitable method of beam redirection can be used including redirection of the beam with a piezoelectric crystal or a micro-electro-mechanical system (MEMS) device such as one or more micromirrors. As an example, voltage can be applied to a piezoelectric crystal to alter the index of refraction of the crystal and steer the write beam.

Another example of a beam director is a "liquid lens" material where the optical properties of the lens can be manipulated by application of electromagnetic signals. Examples of such lenses include the FLUIDFOCUS™ Lens from Philips.

Yet another example of a beam director is an optical element, such as a prism or lens, that can be rotated, translated, or otherwise moved to redirect the write beam over the rewriteable diffraction grating.

The read beam generator 106 is preferably configured to illuminate a majority (preferably, all) of the rewriteable diffraction grating 112 to produce an image 118, as illustrated in FIG. 1B. In some embodiments, the device may include multiple read beam generators to produce multiple read beams to illuminate the entire rewriteable diffraction grating. Because each portion of the diffraction pattern can affect the overall image generated by the pattern, it is preferable that the entire rewriteable diffraction grating be illuminated at one time by the read beam. The resolution of the image may be reduced or otherwise affected if only a portion of the rewriteable diffraction grating is illuminated. In one embodiment, the read beam 106 illuminates the rewriteable diffraction grating 112 only after the write beam 104 has written the entire diffraction pattern on the diffraction grating. In other embodiments, the read beam 106 may illuminate the diffraction grating 112 simultaneous with the writing of a portion of the diffraction pattern by the write beam 104.

Figure 2D:
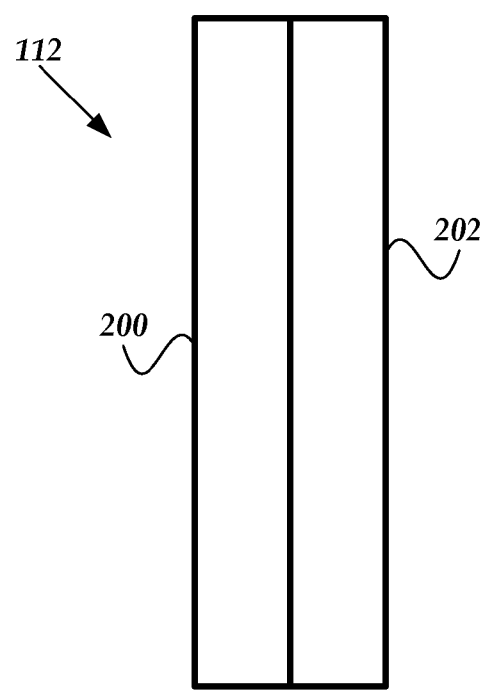

The optional erase beam 108 illuminates the rewriteable diffraction grating 112, as illustrated in FIG. 1C, and erases the diffraction pattern by removing the charge carriers that were transferred from the first layer 200 to the second layer 202 in response to the write beam 104. This regenerates the blank rewriteable diffraction grating, as illustrated in FIG. 2D. For example, the erase beam 108 can be an ultraviolet light source that moves electrons into a conduction band of the second layer 202. The second layer 202 can be connected to ground to drain away these electrons. Preferably, the erase beam 108 illuminates the entire rewriteable diffraction grating 112 simultaneously, but in some embodiments the erase beam may sequentially illuminate portions of the diffraction grating.

In other embodiments, an erase beam is not used. Instead, the diffraction pattern written by the write beam decays quickly enough that the diffraction pattern is erased on its own. In some instances, the decay occurs with a time constant in the range of 10 milliseconds to 1 second or, preferably, in the range of 10 to 100 milliseconds. In at least some instances, this decay period (preferably, more than one decay period) is allowed to proceed before writing the next pattern on the rewriteable diffraction grating.

In one example of the operation of the display 100, an image is provided to, or generated by, the control unit 102 which then converts the image into a diffraction pattern. The control unit 102 controls the write beam generator 104 and beam director 110 to write the diffraction pattern on the rewriteable diffraction grating 112 as the write beam is moved over the grating. The rewriteable diffraction grating 112 is illuminated by the read beam generator 106 to create an image that can be viewed by the observer. The rewriteable diffraction grating 112 is then erased by illumination using the erase beam generator 108 (or allowing the diffraction pattern to relax.) A new image can then be written and projected. Thus, this system can produce holographic moving images.

Figure 3:
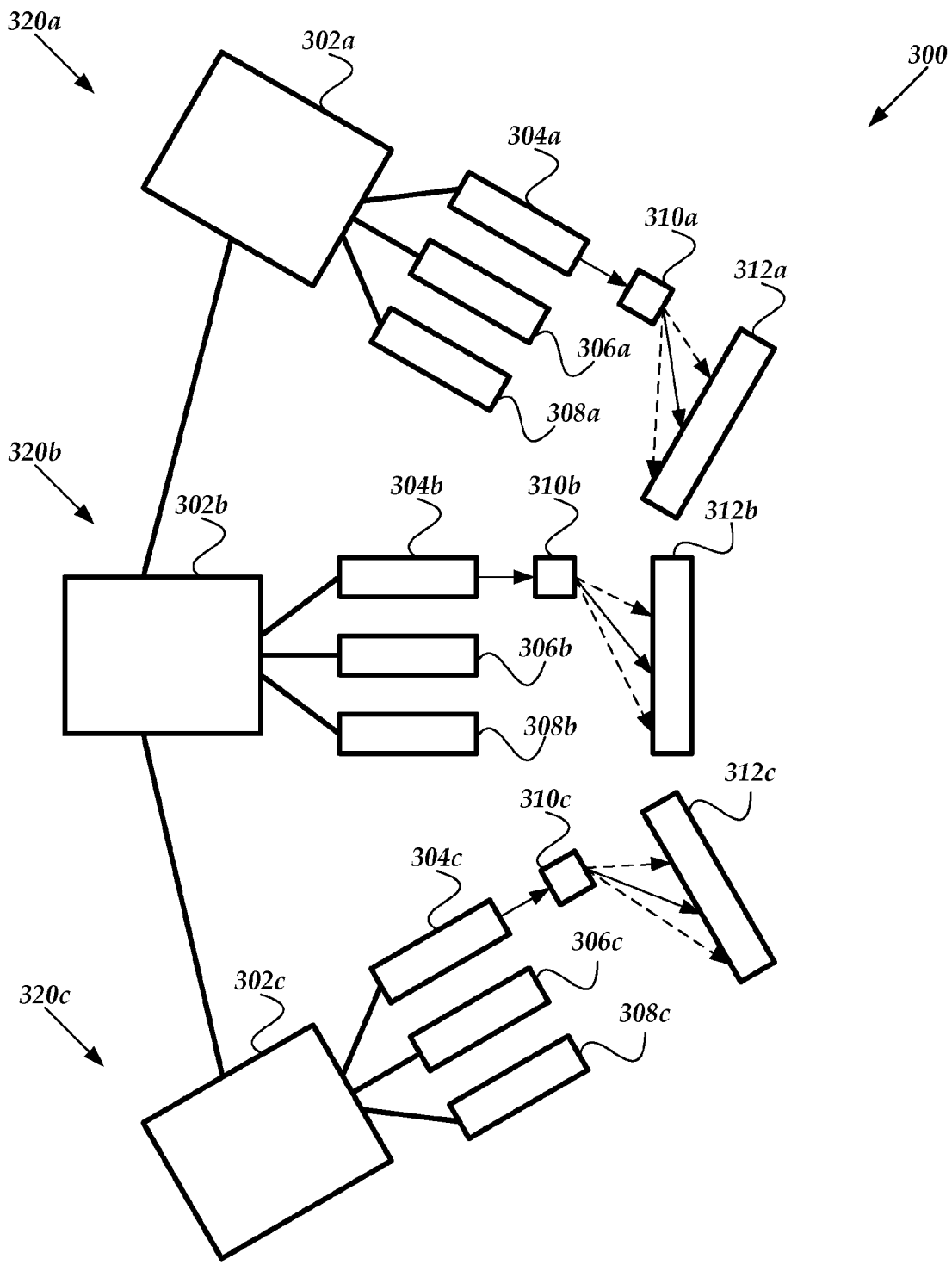
FIG. 3 illustrates a schematic plan view of a display with multiple holographic projection units, according to the invention.

FIG. 3 illustrates one embodiment of a display 300 with multiple (e.g., two or more) holographic projection units 320a, 320b, 320c. In some embodiments, the holographic projection units are each associated with a different color of light for the read beam. For example, three units associated with red, blue, and green read beams can be used. The images from each these units can be superimposed. In at least some embodiments, superimposing images from red, blue, and green units can create a full color image, if desired.

Each unit contains a separate write beam generator 304a, 304b, 304c; read beam generator 306a, 306b, 306c; optional erase beam generator 308a, 308b, 308c; beam director 310a, 310b, 310c; and rewriteable diffraction grating 312a, 312b, 312c. Each of these components can be the same as or similar to the same components described above with respect to the embodiment illustrated in FIGS. 1A-1C. The frequencies of the write beam and read beam can be selected based on the wavelength of light to be used as the read beam to produce the desired image.

Separate control units 302a, 302b, 302c can be used to control the other components (e.g., the beam generators and beam director) in each holographic projection unit, as illustrated in FIG. 3, or a single control unit can be used. In determining the diffraction grating pattern for the respective rewriteable diffraction gratings, one or more of the control unit(s) may also account for the angular and/or translational displacement of that holographic projection unit relative to the other holographic projection units, if necessary. Preferably, the holographic projection units are synchronized so that the diffraction patterns are illuminated simultaneously by the respective read beams. Otherwise, the color of the composite image may appear to fluctuate.

The control unit may include manual and/or automatic controls for adjusting color level for one or more the colors. The control unit may also include manual and/or automatic controls for adjusting the alignment of one or more the individual images relative to the other image(s).

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A rewriteable diffraction grating, comprising:
   a first layer;
   a second layer adjacent to the first layer, the first and second layers defining a boundary between the first and second layers;
   a plurality of first nanoparticles, wherein each first nanoparticle is configured and arranged to selectively generate one or more charge carriers in response to a write beam; and
   a plurality of second nanoparticles, wherein the second nanoparticles are different in composition from the first nanoparticles and each second nanoparticle is configured and arranged to substantially alter its opacity to light from a read beam upon receiving one or more charge carriers from the first nanoparticles and thereby form a light diffraction pattern, with regions that are substantially transparent to the read beam and regions that are substantially opaque to the read beam, in response to a diffraction pattern written on the plurality of first nanoparticles by the write beam;

wherein the plurality of second nanoparticles are disposed in proximity to the plurality of first nanoparticles to permit charge carriers generated by the first nanoparticles to be transferred to the second nanoparticles and to selectively interact with the second nanoparticles; and wherein the second nanoparticles are configured and arranged for erasing the light diffraction pattern by releasing one or more charge carriers in response to illumination of the second nanoparticles with an erase beam;

wherein the first nanoparticles are primarily disposed in the first layer and the second nanoparticles are primarily disposed in the second layer, wherein a portion of the first nanoparticles are diffused into the second layer across the boundary between the first and second layers and a portion of the second nanoparticles are diffused into the first layer across the boundary between the first and second layers.

2. The rewriteable diffraction grating of claim 1, wherein the second nanoparticles comprise second metal ions doping the second nanoparticles.

3. The rewriteable diffraction grating of claim 1, wherein the first and second nanoparticles comprise a semiconductor material.

4. The rewriteable diffraction grating of claim 1, wherein the first nanoparticles comprise a first doping agent and the second nanoparticles comprise a second doping agent, wherein the doping agents are different.

5. The rewriteable diffraction grating of claim 4, wherein the first doping agent comprises first metal ions disposed in the first nanoparticles.

6. The rewriteable diffraction grating of claim 1, wherein the first layer further comprises a binder selected from polyvinyl alcohol, polymethyl methacrylate, polycarbonate, or silica glass.

7. The rewriteable diffraction grating of claim 1, wherein the first and second nanoparticles are doped silica nanoparticles.

8. The rewriteable diffraction grating of claim 7, wherein the first nanoparticles are iron-doped silica nanoparticles.

9. The rewriteable diffraction grating of claim 8, wherein the second nanoparticles are chromium-doped silica nanoparticles.

10. A holographic display, comprising:
at least three holographic projection units configured and arranged to create images that overlap with each other to form a final multicolor image, each image creation unit comprising
a write beam generator,
a read beam generator, and
a rewriteable diffraction grating configured and arranged to generate a diffraction pattern in response to a write beam from the write beam generator and to produce an image when illuminated with a read beam from the read beam generator, the rewriteable diffraction grating comprising
a first layer;
a second layer adjacent to the first layer, the first and second layers defining a boundary between the first and second layers;
a plurality of first nanoparticles, wherein each first nanoparticle is configured and arranged to selectively generate one or more charge carriers in response to the write beam; and
a plurality of second nanoparticles, wherein the second nanoparticles are different in composition from the first nanoparticles and each second nanoparticle is configured and arranged to substantially alter its opacity to light from the read beam upon receiving one or more charge carriers from the first nanoparticles and thereby form a light diffraction pattern, with regions that are substantially transparent to the read beam and regions that are substantially opaque to the read beam, in response to the diffraction pattern written on the plurality of first nanoparticles by the write beam;

wherein the plurality of second nanoparticles are disposed in proximity to the plurality of first nanoparticles to permit charge carriers generated by the first nanoparticles to be transferred to the second nanoparticles and to selectively interact with the second nanoparticles; and wherein the second nanoparticles are configured and arranged for erasing the light diffraction pattern by releasing one or more charge carriers in response to illumination of the second nanoparticles with an erase beam;

wherein the first nanoparticles are primarily disposed in the first layer and the second nanoparticles are primarily disposed in the second layer, wherein a portion of the first nanoparticles are diffused into the second layer across the boundary between the first and second layers and a portion of the second nanoparticles are diffused into the first layer across the boundary between the first and second layers.

11. The holographic display of claim 10, wherein each holographic projection unit further comprises an erase beam generator configured and arranged to erase the pattern generated by the write beam.

12. The holographic display of claim 10, wherein each holographic projection unit further comprising a beam director configured and arranged to receive the write beam from the write beam generator and move the write beam over the rewriteable diffraction grating.

13. The holographic display of claim 10, wherein the at least three holographic projection units comprise a red holographic projection unit, a blue holographic projection unit, and a green holographic projection unit.

14. The holographic display of claim 10, wherein at least one of the holographic projection units further comprises at least one control unit coupled to at least the write beam generator.

15. The holographic display of claim 14, wherein the control unit is configured and arranged to convert an image into a diffraction pattern for writing on the rewriteable diffraction grating.

16. The holographic display of claim 10, wherein the holographic display is configured and arranged to produce a full-color, moving image.

17. A method of making a holographic image, the method comprising:
writing a diffraction pattern on each of a plurality of rewriteable diffraction gratings using a write beam, wherein each of the rewriteable diffraction gratings comprises
a first layer;

a second layer adjacent to the first layer, the first and second layers defining a boundary between the first and second layers;

a plurality of first nanoparticles, wherein each first nanoparticle is configured and arranged to selectively generate one or more charge carriers in response to a write beam; and a plurality of second nanoparticles, wherein the second nanoparticles are different in composition from the first nanoparticles and each second nanoparticle is configured and arranged to substantially alter its opacity to light from a read beam upon receiving one or more charge carriers from the first nanoparticles and thereby form a light diffraction pattern, with regions that are substantially transparent to the read beam and regions that are substantially opaque to the read beam, in response to a diffraction pattern written on the plurality of first nanoparticles by the write beam;

wherein the plurality of second nanoparticles are disposed in proximity to the plurality of first nanoparticles to permit charge carriers generated by the first nanoparticles to be transferred to the second nanoparticles and to selectively interact with the second nanoparticles; and wherein the second nanoparticles are configured and arranged for erasing the light diffraction pattern by releasing one or more charge carriers in response to illumination of the second nanoparticles with an erase beam;

wherein the first nanoparticles are primarily disposed in the first layer and the second nanoparticles are primarily disposed in the second layer, wherein a portion of the first nanoparticles are diffused into the second layer across the boundary between the first and second layers and a portion of the second nanoparticles are diffused into the first layer across the boundary between the first and second layers;

illuminating each of the diffraction patterns with a corresponding read beam; and overlapping the images formed by each of the diffraction patterns.

18. The method of claim 17, wherein writing a diffraction pattern comprises sequentially writing a plurality of diffraction patterns on each of the plurality of rewriteable diffraction gratings to produce a moving image when sequentially illuminated with a read beam.

19. The method of claim 17, wherein writing a diffraction pattern comprises writing a different diffraction pattern on each of a plurality of rewriteable diffraction gratings.

20. The method of claim 17, wherein illuminating each of the diffraction patterns with a read beam comprises illuminating each of the diffraction patterns with a read beam of a different color of light.

21. A method of making a rewriteable diffraction grating, the method comprising:

forming a first layer comprising a plurality of first nanoparticles, wherein each first nanoparticle is configured and arranged to selectively generate one or more charge carriers in response to the write beam;

forming a second layer comprising a plurality of second nanoparticles, wherein the second nanoparticles are different in composition from the first nanoparticles and each second nanoparticle is configured and arranged to substantially alter its opacity to light from a read beam upon receiving one or more charge carriers from the first nanoparticles and thereby form a light diffraction pattern, with regions that are substantially transparent to the read beam and regions that are substantially opaque to the read beam, in response to a diffraction pattern written on the plurality of first nanoparticles by the write beam, wherein the plurality of second nanoparticles are disposed in proximity to the plurality of first nanoparticles to permit charge carriers generated by the first nanoparticles to be transferred to the second nanoparticles and to selectively interact with the second nanoparticles, and wherein the second nanoparticles are configured and arranged for erasing the light diffraction pattern by releasing one or more charge carriers in response to illumination of the second nanoparticles with an erase beam; and diffusing a portion of the first nanoparticles into the second layer across the boundary between the first and second layers and diffusing a portion of the second nanoparticles into the first layer across the boundary between the first and second layers.

* * * * *